(12) United States Patent
Ibryam

(10) Patent No.: US 11,269,686 B2
(45) Date of Patent: Mar. 8, 2022

(54) ADAPTIVE CONSUMER THREAD POOL

(71) Applicant: Red Hat, Inc., Raleigh, NC (US)

(72) Inventor: Bilgin Ismet Ibryam, London (GB)

(73) Assignee: Red Hat, Inc., Raleigh, NC (US)

(*) Notice: Subject to any disclaimer, the term of this patent is extended or adjusted under 35 U.S.C. 154(b) by 86 days.

(21) Appl. No.: 16/694,474

(22) Filed: Nov. 25, 2019

(65) Prior Publication Data
US 2021/0157649 A1    May 27, 2021

(51) Int. Cl.
G06F 9/46     (2006.01)
G06F 9/50     (2006.01)
G06F 9/52     (2006.01)

(52) U.S. Cl.
CPC .............. G06F 9/5038 (2013.01); G06F 9/52 (2013.01)

(58) Field of Classification Search
CPC .................................. G06F 9/5038; G06F 9/52
See application file for complete search history.

(56) References Cited

U.S. PATENT DOCUMENTS

| 8,423,619 | B2 | 4/2013 | Hawkins et al. | |
| 9,015,718 | B1* | 4/2015 | Zhang | G06F 9/5022 |
| | | | | 718/100 |
| 9,998,418 | B2 | 6/2018 | Clark et al. | |
| 2014/0089928 | A1* | 3/2014 | Stern | G06F 9/5083 |
| | | | | 718/102 |

FOREIGN PATENT DOCUMENTS

| CN | 108595282 A | 9/2018 |
| CN | 109885410 A | 6/2019 |
| KR | 101037818 B1 | 5/2011 |

OTHER PUBLICATIONS

WSO2; "WSO2 Message Broker"; Version 3.2.0; WSO2 Inc. Copyright © 2019; Accessed Date: Oct. 1, 2019; https://wso2.com/products/message-broker/; 5 Pages.
"Better Performance Through Threading"; @AndroidDev on Twitter; Accessed Date: Oct. 1, 2019; https://developer.android.com/topic/performance/threads; 7 Pages.

* cited by examiner

Primary Examiner — Gregory A Kessler
(74) Attorney, Agent, or Firm — K&L Gates LLP

(57) ABSTRACT

The present disclosure provides for a system with an adaptive thread pool for processing messages. The system includes a processor and a memory storing instructions. The processor allocates a first quantity of threads in a thread pool to process a set of messages in parallel. The processor then measures one or more performance metrics of the system while processing the messages with the first quantity of threads. The processor then determines whether each of the one or more performance metrics meets a respective predetermined threshold. The processor then increases the allocation of the first quantity of threads to a second quantity of threads in the thread pool if each of the one or more performance metrics meets the respective predetermined threshold. The processor may also decrease the quantity of threads if at least one performance metric does not meet its predetermined threshold.

20 Claims, 6 Drawing Sheets

ADAPTIVE CONSUMER THREAD POOL

BACKGROUND

A producer application may transmit messages to a consumer application. When the number of producers and consumers, and the number of messages being transmitted, scales to a large number, a message broker may be used. A message broker may receive messages from a group of producers and may determine how to distribute the messages to a group of consumers. The message broker may also translate the messages from a formal messaging protocol of the producer to a formal messaging protocol of the consumer. Consumer applications often include a thread pool for processing received messages. The thread pool includes a quantity of threads kept in use and/or in reserve for executing tasks. Consumers may concurrently process messages in parallel using more than one thread in the thread pool.

SUMMARY

The present disclosure provides new and innovative systems and methods for processing messages with a thread pool. In an example, a system includes a processor and a memory storing instructions. The instructions, when executed by the processor, cause the processor to allocate a first quantity of threads in a thread pool to process a first plurality of messages. The instructions also cause the processor to measure one or more performance metrics of the system while processing in parallel the first plurality of messages with the first quantity of threads, and determine whether each of the one or more performance metrics meets a respective predetermined threshold. The instructions also cause the processor to increase the allocation of the first quantity of threads to a second quantity of threads in the thread pool in response to determining that each of the one or more performance metrics meets the respective predetermined threshold.

In an example, a method includes allocating a first quantity of threads in a thread pool to process a first plurality of messages. One or more performance metrics of the system are measured while processing in parallel the first plurality of messages with the first quantity of threads. It is determined whether each of the one or more performance metrics meets a respective predetermined threshold. The allocation of the first quantity of threads is increased to a second quantity of threads in the thread pool in response to determining that each of the one or more performance metrics meets the respective predetermined threshold.

In an example, a non-transitory, computer-readable medium stores instructions. The instructions, when performed by a processor, cause the processor to allocate a first quantity of threads in a thread pool to process a first plurality of messages, and to measure one or more performance metrics of the system while processing in parallel the first plurality of messages with the first quantity of threads. The instructions also cause the processor to determine whether each of the one or more performance metrics meets a respective predetermined threshold, and to increase the allocation of the first quantity of threads to a second quantity of threads in the thread pool in response to determining that each of the one or more performance metrics meets the respective predetermined threshold.

Additional features and advantages of the disclosed method and apparatus are described in, and will be apparent from, the following Detailed Description and the Figures.

The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

DETAILED DESCRIPTION

Figure 1:
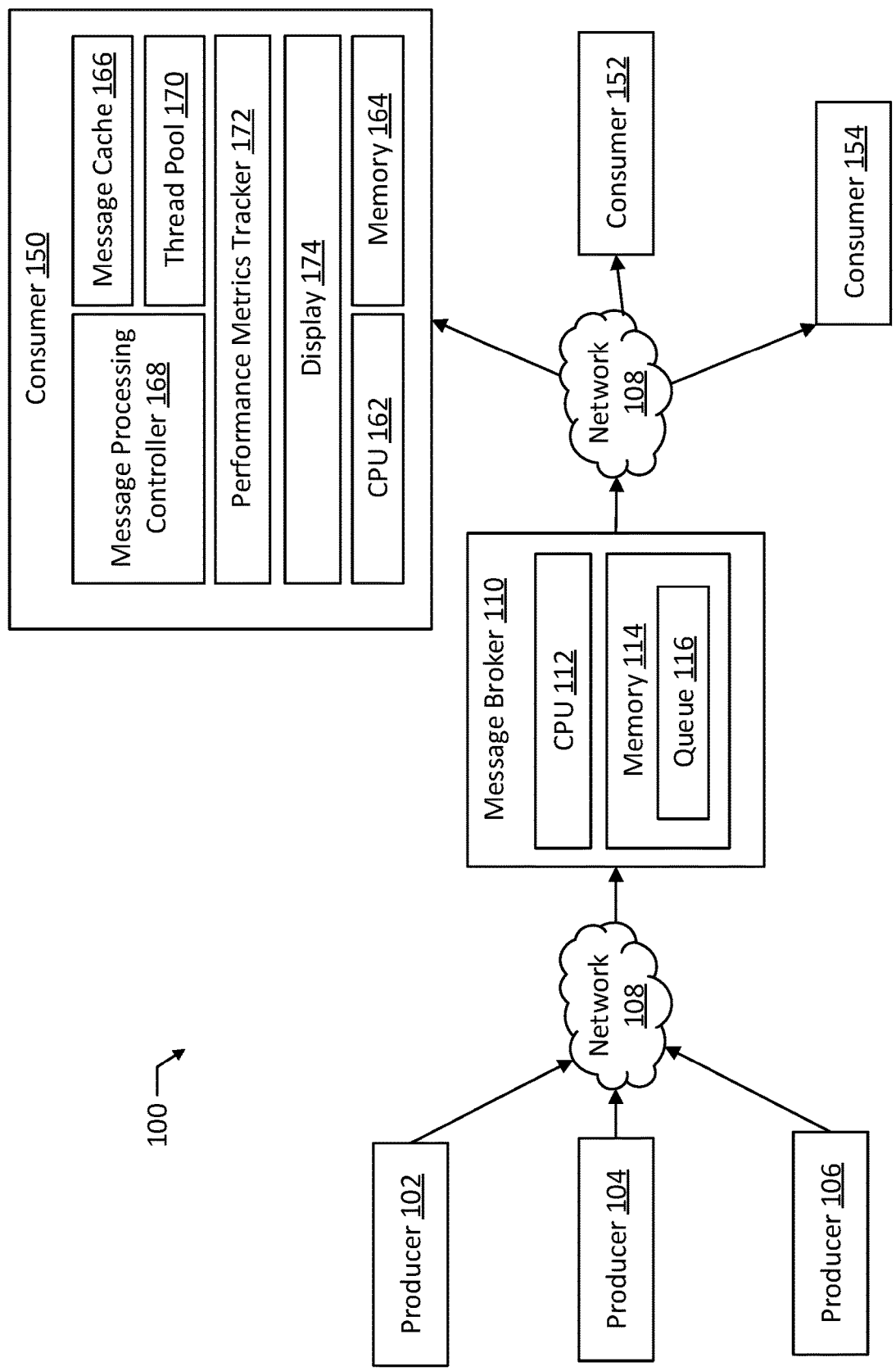
FIG. 1 shows an example message processing system, including producers, consumers, and a message broker, according to an aspect of the present disclosure.

Message brokers are used in many instances for load leveling and buffering to handle sudden bursts of activity from producers. After a message broker transmits messages to a consumer, the consumer must allocate a certain quantity of threads from its thread pool to process the messages in parallel. Allocating the optimal quantity of threads, however, can be a challenge. If a consumer allocates too few threads, the consumer may process all of the messages, but may be underutilized and could process more messages if more threads were allocated. If a consumer allocates too many threads, the consumer may become oversaturated with messages and stall out because the consumer runs out of memory resources. A consumer may also experience network contention issues if it allocates too many threads. Additionally, creating too many threads wastes system resources and costs time creating threads that may be unused.

One way a consumer may be configured to allocate a quantity of threads is to allocate a fixed quantity of threads each time the consumer receives messages to process. Determining where to set the optimal fixed quantity is difficult, however, and typically requires gradually resetting and increasing the quantity of threads, and testing until an optimal quantity is determined. Additionally, the optimal quantity of threads for the consumer to allocate does not remain consistent. For instance, the optimal quantity of threads may be dependent on downstream systems that the consumer is accessing, which are also utilizing the thread pool. Additionally or alternatively, the optimal quantity may vary across the environments the consumer is in and may vary across time. Accordingly, a fixed quantity of threads may often lead to a consumer becoming oversaturated or being underutilized.

Another way a consumer may be configured to allocate a quantity of threads is to program a range with a minimum and a maximum quantity of threads for processing messages. The consumer may also be configured to control how fast to scale up and down the quantity of threads within the given range. In this approach, however, when there are a lot of messages buffered on the broker, which is a common scenario, the consumer quickly reaches the maximum quantity of threads as it receives messages from the broker. The consumer then typically remains at the maximum quantity as long as there are messages on the broker. As with the fixed quantity approach described above, the configured maximum quantity is often not the optimal quantity. It is often not high enough and leaves the consumer underutilized. Or, if the maximum quantity, which the consumer is often at, is set too high, a large portion of the consumer's memory may be used which may cause the consumer to slow down and fail to process the messages. Additionally, too high of a maximum quantity may cause the consumer to take a large portion of messages from the message broker, preventing them from going to other consumers, which decreases message processing efficiency of the system as a whole.

Both of the above-described approaches are dependent upon either a fixed quantity and/or a number of messages in the broker, but fail to enable a consumer to properly utilize the quantity of threads in its thread pool. Accordingly, the present disclosure provides for a system and method that enhances a consumer's ability to efficiently allocate a quantity of threads for processing messages by basing the quantity of threads allocated on system performance metrics of the consumer. For example, a consumer may process messages in parallel with ten threads and may do so in a certain amount of time. The consumer may measure various performance metrics during that time, or at the end of that time, and may increase the quantity of threads for processing received messages (e.g., to 15, to 20, to 30, to 60, etc.) until one or more of the measured performance metrics degrade to a preconfigured threshold (e.g., a certain latency is reached). Upon measuring a degradation to the preconfigured threshold, the consumer may decrease the quantity of threads, for example, to the quantity of threads used prior to the degradation inducing quantity. At some subsequent time, if the performance metrics do not further degrade, the consumer may then attempt to increase the quantity of threads again and measure the responsive performance metrics.

By allocating the quantity of threads based on system performance metrics, a consumer may allocate a quantity of threads more efficiently by adapting to conditions that affect its ability to process messages. For instance, at one point in time, a downstream system may be utilizing a large portion of the consumer's memory, resulting in the consumer only being able to allocate a relatively low quantity of threads for processing messages. At a subsequent time, the downstream system may no longer be utilizing the consumer's memory and thus the consumer may increase the quantity of threads for processing messages to a relatively high quantity. At a subsequent time still, however, an increased quantity of threads allocated may cause the consumer to reach a processing limit with regard to its CPU, and thus the consumer may decrease the quantity of threads allocated. Accordingly, the presently disclosed system makes it less likely that a consumer will be underutilized, become saturated with messages, or have unused allocated threads.

FIG. 1 shows an example system 100, according to an aspect of the present disclosure. The example system 100 may include a set of producers 102, 104, and 106 that transmit messages to a message broker 110. For instance, the producers 102, 104, and 106 may transmit the messages over a network 108 to the message broker 110. The network 180 can include, for example, the Internet or some other data network, including, but not limited to, any suitable wide area network or local area network. The message broker 110 may store the received messages in a queue 116 in its memory 114. A processor of the message broker 110 (e.g., the CPU 112) may transmit the messages from the queue 116 to a set of consumers 150, 152, 154, for instance, over the network 108.

FIG. 1 further illustrates a box diagram of an example consumer 150, according to an aspect of the present disclosure. In other examples, the components of the consumer 150 may be combined, rearranged, removed, or provided on a separate device or server. The example consumer 150 may include a processor in communication with a memory 164. The processor may be a CPU 162, an ASIC, or any other similar device. The example consumer 150 may also include a display 174. The display 174 may be any suitable display for presenting information and may be a touch display. The example consumer 150 may also include a performance metrics tracker 172 programmed to measure system performance metrics of the consumer 150. For example, the system performance metrics may be throughput, latency/processing time, and/or system utilization, in some instances. The performance metrics tracker 172 may be implemented by software executed by the CPU 162.

The example consumer 150 may include a message cache 166 for storing messages received from the message broker 110. The example consumer 150 may also include a thread pool 170 that includes a quantity of threads kept in reserve for executing tasks. In some instances, the example consumer 150 may also include a message processing controller 168 for processing messages. The message processing controller 168 may be programmed to allocate a quantity of threads from the thread pool 170 to process in parallel a set of messages stored in the message cache 166. As will be described in more detail below, the message processing controller 168 may be programmed to allocate the quantity of threads based on a set of performance metrics measured by the performance metrics tracker 172.

Figure 2:
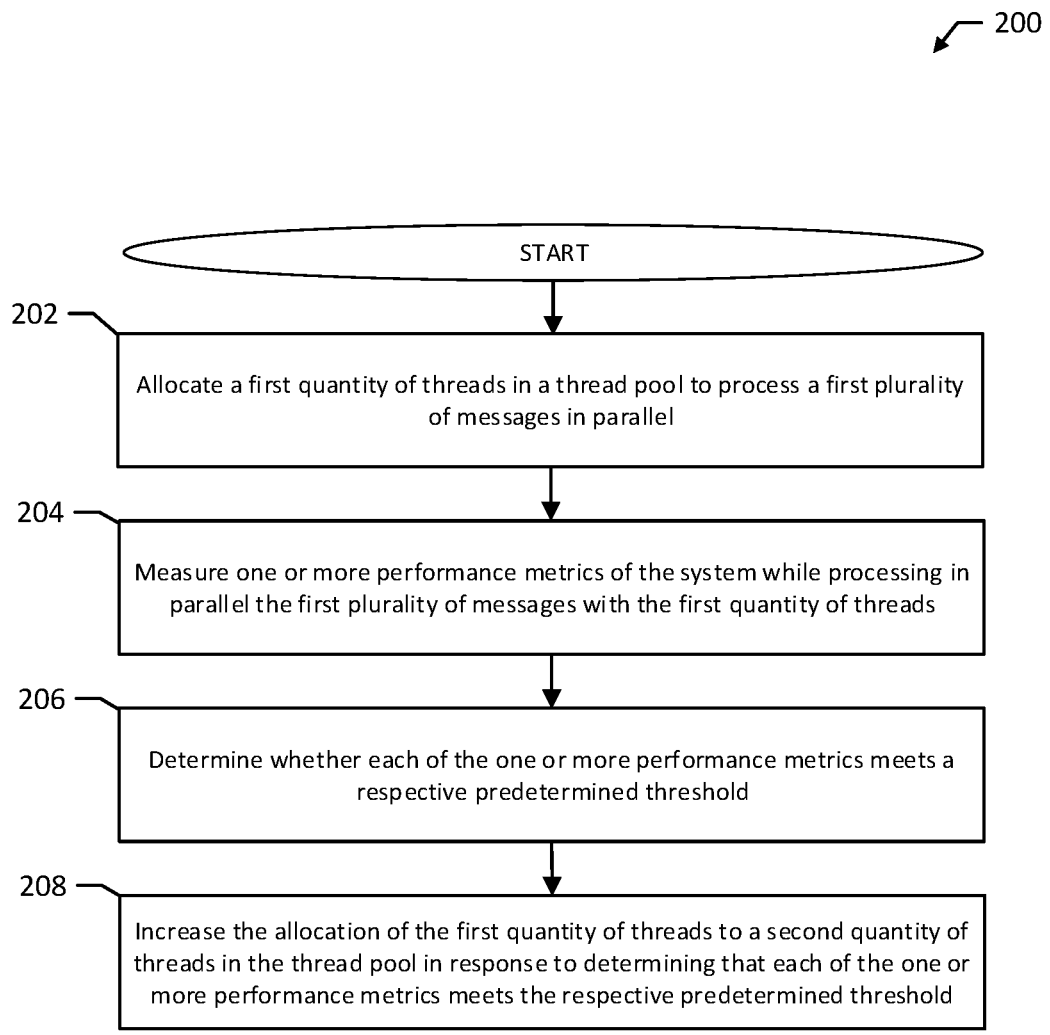
FIG. 2 shows a box diagram of an example method for adapting an allocation of threads for processing messages, according to an aspect of the present disclosure.

FIG. 2 shows a flow chart of an example method 200 for adjusting a quantity of threads for processing messages in parallel, according to an aspect of the present disclosure. Although the example method 200 is described with reference to the flowchart illustrated in FIG. 2, it will be appreciated that many other methods of performing the acts associated with the method 200 may be used. For example, the order of some of the blocks may be changed, certain blocks may be combined with other blocks, and some of the blocks described are optional. The method 200 may be performed by processing logic that may comprise hardware (circuitry, dedicated logic, etc.), software, or a combination of both.

The example method 200 includes allocating a first quantity of threads in a thread pool to process a first plurality of messages in parallel (block 202). In an example, the message processing controller 168 of the consumer 150 may allocate a first quantity of threads (e.g., 100) in the thread pool 170 to process in parallel a first plurality of messages from the message cache 166. The example method 200 may then include measuring one or more performance metrics of the system while processing in parallel the first plurality of messages with the first quantity of threads (block 204). In an example, the performance metrics tracker 172 of the consumer 150 may measure one or more system performance metrics (e.g., throughput and latency) of the consumer 150 while the message processing controller 168 processes the first plurality of messages from the message cache 166 with the 100 threads from the thread pool 170. In some instances, the performance metrics tracker 172 may continuously measure the one or more performance metrics of the consumer 150. In other instances, the performance metrics tracker 172 may measure the performance metrics each time a predetermined quantity of messages are processed (e.g., 2, 5, 10, 20, 50, 100). Additionally or alternatively, in such instances, the performance metrics tracker 172 may measure the performance metrics each time a predetermined amount of time elapses (e.g., every 5 seconds).

In some examples, the one or more performance metrics may include at least one of throughput, latency, and system utilization. Throughput may include a rate at which the consumer 150 processes messages. For example, throughput may be measured in bytes per second or messages per second. Latency may include an amount of time it takes for the consumer 150 to process a message. For example, latency may be measured in average time (e.g., in milliseconds) to process a message or may be measured in average time (e.g., in milliseconds) to process a quantity of data (e.g., megabytes). System utilization may include a utilization of the processor or memory 164 of the consumer 150. For example, utilization of the processor may be measured in a percentage out of 100 of the CPU 162 that is being utilized by processes. In another example, utilization of the memory 164 may be measured in a percentage out of 100 that the memory 164 is being utilized by processes. In some examples, the performance metrics may include a processing outcome, such as whether the consumer 150 is successfully processing messages and/or an error rate of the consumer 150. The error rate may include a rate at which the consumer 150 is failing to process messages with respect to time (e.g., one failed message per second).

The example method 200 may then include determining whether each of the one or more performance metrics meets a respective predetermined threshold (block 206). Each performance metric includes its own predetermined threshold. In an example, the performance metrics tracker 172 of the consumer 150 may determine whether each of the throughput and the latency of the consumer 150 meet their respective predetermined threshold stored in the memory 164 of the consumer 150. For example, the predetermined threshold for throughput may be 5 messages/second (msg/s) and the predetermined threshold for latency may be 50 milliseconds (ms). In various aspects of the present disclosure, the predetermined thresholds for the performance metrics may be programmed into the memory 164 of the consumer 150 upon manufacture. In some aspects, the predetermined thresholds are selected by a user at a time subsequent to manufacture. In some examples, the predetermined thresholds may be adjusted by the user at any time.

In some instances of the present disclosure, the predetermined threshold may be a previously measured performance metric, such as a measured performance metric prior to processing the first plurality of messages. For example, the measured performance metric may be the directly preceding measured performance metric prior to processing the first plurality of messages. In such instances, determining whether a respective performance metric meets its predetermined threshold includes comparing the measured respective performance metric after processing the first plurality of messages with a value of the performance metric that was measured prior to processing the first plurality of messages. In some aspects of the present disclosure, the predetermined threshold for a performance metric may be based on a set of measured values for the performance metric. In such aspects, the predetermined threshold may be referred to as a comparison metric, as described in connection with FIG. 3 below.

In various examples of the present disclosure, the predetermined threshold for throughput includes a specific message processing rate. For instance, the predetermined threshold for throughput may be 5 msg/s as in the above example. Therefore, in such examples, the throughput performance metric of the consumer 150 meets its respective predetermined threshold if the measured throughput equals or exceeds 5 msg/s, for example, if the consumer 150 is processing at a rate of 10 msg/s. Conversely, the throughput performance metric of the consumer 150 does not meet its respective predetermined threshold if the measured throughput is below 5 msg/s, for example, if the consumer 150 is processing at a rate of 4 msg/s. In some instances, equaling the specific message processing rate (e.g., 5 msg/s) may constitute failing to meet the predetermined threshold.

In various examples, the predetermined threshold for latency includes a specific message processing time. For instance, the predetermined threshold for latency may be 50 ms as in the above example. Therefore, in such examples, the latency performance metric of the consumer 150 meets its respective predetermined threshold if the measured latency is equal to or below 50 ms, for example, if the latency is 20 ms. Conversely, the latency performance metric of the consumer 150 does not meet its respective predetermined threshold if the measured latency exceeds 50 ms, for example, if the latency is 52 ms. In some instances, equaling the specific message processing time (e.g., 50 ms) may constitute failing to meet the predetermined threshold.

In various examples, the predetermined threshold for system utilization includes a specific percentage of memory usage (e.g., 90%). Therefore, in such examples, the system utilization performance metric of the consumer 150 meets its respective predetermined threshold if the measured memory usage is equal to or below 90%, for example, if memory usage is at 50%. Conversely, the system utilization performance metric of the consumer 150 does not meet its respective predetermined threshold if the measured memory usage exceeds 90%, for example, 91%. In some instances, equaling the specific percentage of memory usage (e.g., 90%) may constitute failing to meet the predetermined threshold.

In various examples, the predetermined threshold for system utilization includes a specific percentage of processor utilization (e.g., 75%). Therefore, in such examples, the system utilization performance metric of the consumer 150 meets its respective predetermined threshold if the measured processor utilization is equal to or below 75%, for example, if CPU usage is at 15%. Conversely, the system utilization performance metric of the consumer 150 does not meet its respective predetermined threshold if the measured processor utilization exceeds 75%, for example, if CPU usage is at 100%. In some instances, equaling the specific percentage of processor utilization (e.g., 75%) may constitute failing to meet the predetermined threshold.

In various examples, the predetermined threshold for processing outcome includes a specific rate at which the consumer 150 is failing to process messages (e.g., 1 msg/s). Therefore, in such examples, the processing outcome performance metric of the consumer 150 meets its respective predetermined threshold if the measured processing outcome is equal to or below 1 msg/s, for example, if the consumer is successfully processing every message it receives. Conversely, the processing outcome performance metric of the consumer 150 does not meet its respective predetermined threshold if the measured processing outcome exceeds 1 msg/s, for example, 2 msg/s. In some instances, equaling the specific rate at which the consumer 150 is failing to process messages (e.g., 1 msg/s) may constitute failing to meet the predetermined threshold.

The example method 200 may then include increasing the allocation of the first quantity of threads to a second quantity of threads in the thread pool in response to determining that each of the one or more performance metrics meets the respective predetermined threshold (block 208). In an example, the performance metrics tracker 172 of the consumer 150 may measure the throughput of the consumer 150 at 20 msg/s and the latency of the consumer 150 at 45 ms, thus determining that both the throughput and latency meet their respective predetermined thresholds (e.g., 5 msg/s and 50 ms, respectively). In response, the message processing controller 168 of the consumer 150 may increase the allocation of the first quantity of threads (e.g., 100) for processing messages in the thread pool 170 to a second quantity of threads (e.g., 125).

In some aspects of the present disclosure, the example method 200 may also then include measuring the one or more performance metrics of the system while processing in parallel a second plurality of messages with the second quantity of threads. In an example, the performance metrics tracker 172 of the consumer 150 may measure the throughput and latency of the consumer 150 while the thread pool 170 processes the second plurality of messages from the message cache 166 with the second quantity of threads (e.g., 125). In some instances, if the message cache 166 does not contain a sufficient quantity of messages, the processor of the consumer 150 may request additional messages from the message broker 110 prior to processing the second plurality of messages.

The example method 200 may also then include determining whether each of the one or more performance metrics meets the respective predetermined threshold. In an example, the performance metrics tracker 172 of the consumer 150 may measure the throughput of the consumer 150 at 18 msg/s and the latency of the consumer 150 at 55 ms, thus determining that the throughput meets its respective predetermined threshold (e.g., 5 msg/s), but that latency does not meet its respective predetermined threshold (e.g., 50 ms). The example method 200 may then include decreasing the allocation of the second quantity of threads (e.g., 125) to a third quantity of threads (e.g., 100) in response to determining that at least one performance metric does not meet the respective predetermined threshold. In other examples, the second quantity (e.g., 125) may be decreased to a third quantity (e.g., 100) upon determining that more than one performance metric fails to meet its respective predetermined threshold. For instance, in such other examples, the message processing controller 168 may maintain the allocation of threads if throughput and latency meet their respective predetermined thresholds and system utilization does not; however, the message processing controller 168 may decrease the allocation of threads if throughput meets its respective predetermined threshold, and latency and system utilization do not.

In some aspects of the present disclosure, the third quantity of threads is equal to the first quantity of threads. Thus, in an example, upon measuring that latency does not meet its threshold, the consumer 150 may decrease the second quantity of threads (e.g., 125) to the first/third quantity (e.g., 100), the quantity that last resulted in each of throughput and latency meeting their respective predetermined thresholds. The message processing controller 168 of the consumer 150 may then process messages with the third quantity of threads (e.g., 100).

In other aspects of the present disclosure, the third quantity may be greater than the first quantity. In an example, upon measuring that latency does not meet its threshold, the consumer 150 may decrease the second quantity of threads (e.g., 125) to a third quantity (e.g., 110). Thus, in such aspects, the consumer 150 does not decrease the quantity all the way back to the quantity that last resulted in throughput and latency each meeting their respective predetermined threshold (e.g., 100), but rather makes a smaller decrease. This smaller decrease enables the consumer 150 to test whether the consumer 150 is able to handle a smaller increase in allocation over the first quantity of threads (e.g., increasing from 100 to 110), as compared to the larger increase of the second quantity (e.g., increasing from 100 to 125). The consumer 150 may then process messages with the third quantity of threads (e.g., 110). In other aspects of the present disclosure, the third quantity may be less than the first quantity. In an example, upon measuring that latency does not meet its threshold, the consumer 150 may decrease the second quantity of threads (e.g., 125) to a third quantity (e.g., 90). The consumer 150 may then process messages with the third quantity of threads (e.g., 90).

In some aspects of the present disclosure, the size of the decrease from the second quantity of threads to the third quantity of threads may be proportional to the measured performance metrics. For example, a measured latency of 100 ms failing to meet its threshold of 50 ms may result in a greater decrease in the allocation of threads (e.g., 125 to 105) than a measured latency of 55 ms failing to meet the threshold of 50 ms (e.g., 125 to 120). In another example, both throughput and latency failing to meet their respective predetermined threshold may result in a greater decrease in the allocation of threads (e.g., 125 to 110) than only latency failing to meet its threshold (e.g., 125 to 115). In some instances, the two preceding examples may also be combined. Various proportions may be used to decrease the quantity of allocated threads in response to the gap in failing to meet a threshold and/or the number of performance metrics failing to meet their respective threshold.

In some instances, the allocation of the second quantity of threads may be decreased to the third quantity of threads, as described above, in response to at least one performance metric failing to meet its respective predetermined threshold a single time. For example, the consumer 150 may decrease the allocation of threads upon the first time that the performance metrics tracker 172 of the consumer 150 measures a latency above its predetermined threshold. In other instances, the allocation of the second quantity of threads may be decreased to the third quantity in response to the at least one performance metric failing to meets its respective predetermined threshold for a predetermined amount of time (e.g., seconds) or for a predetermined quantity of messages processed (e.g., 10). For example, the consumer 150 may decrease the allocation of threads after the performance metrics tracker 172 measures a latency above its predetermined threshold for 10 consecutive seconds, but not before. Thus, a performance metric that briefly fails to meet its respective predetermined threshold, but quickly rebounds, does not cause the allocated quantity of threads to be decreased. For example, for a latency threshold of 50 ms, the performance metrics tracker 172 measuring a latency of 48 ms, then of 51 ms for one second, and then of 45 ms, would not cause the message processing controller 168 to decrease the allocation of threads in the thread pool 170.

Figure 3:
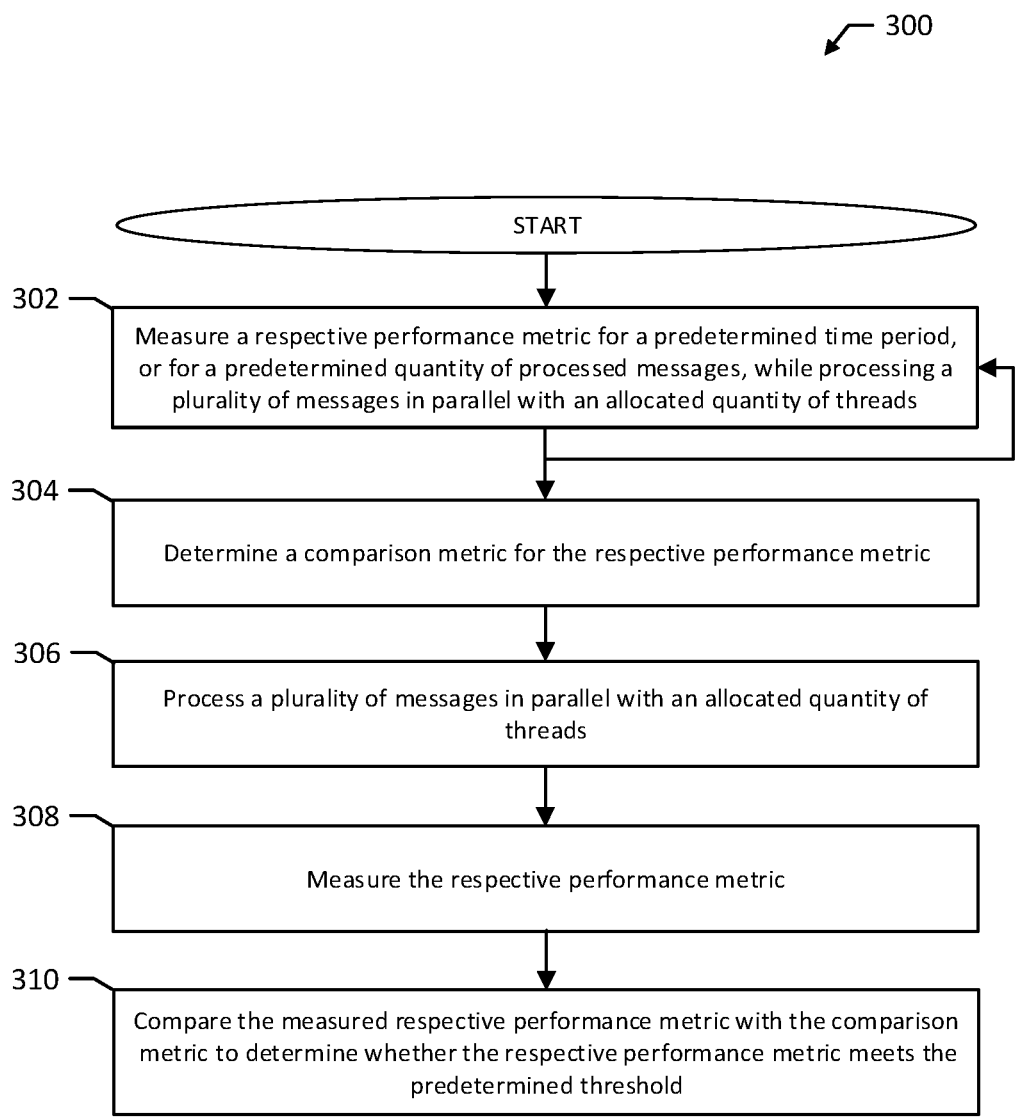
FIG. 3 shows a box diagram of an example method for adapting an allocation of threads for processing messages, according to an aspect of the present disclosure.

FIG. 3 shows a flow chart of an example method 300 for comparing a measured performance metric with a comparison metric, according to an aspect of the present disclosure. Although the example method 300 is described with reference to the flowchart illustrated in FIG. 3, it will be appreciated that many other methods of performing the acts associated with the method 300 may be used. For example, the order of some of the blocks may be changed, certain blocks may be combined with other blocks, and some of the blocks described are optional. The method 300 may be performed by processing logic that may comprise hardware (circuitry, dedicated logic, etc.), software, or a combination of both.

The example method 300 includes measuring a respective performance metric for a predetermined time period, or for a predetermined quantity of messages, while processing a plurality of messages in parallel with an allocated quantity of threads (block 302). During the predetermined time period or for the predetermined quantity of messages, the performance metrics tracker 172 may measure a respective performance metric a plurality of times, which is illustrated in FIG. 3 by the arrow creating a loop. In an example, the performance metrics tracker 172 may measure the latency of the consumer 150 for a predetermined amount of time (e.g., 5 minutes) or for a predetermined quantity of messages (e.g., 500 messages).

The example method 300 may then include determining a comparison metric for the respective performance metric (block 304). In some instances, the comparison metric may be determined by computing an average of the respective performance metric over the predetermined time or quantity of messages. In other instances, the comparison metric may be determined by identifying a maximum or minimum value of the respective performance metric over the predetermined time or quantity of messages. In an example, the performance metrics tracker 172 may compute an average latency value of 30 ms after measuring latency for 3 minutes.

The example method 300 may then include processing a plurality of messages in parallel with an allocated quantity of threads (block 306). In an example, the message processing controller 168 of the consumer 150 may process in parallel a plurality of messages using an allocated quantity of threads (e.g., 100) from the thread pool 170. The example method 300 may then include measuring the respective performance metric (block 308). In an example, the performance metrics tracker 172 may measure a latency of 25 ms of the consumer 150. The example method 300 may then include comparing the measured respective performance metric with the comparison metric to determine whether the respective performance metric meets the predetermined threshold (block 310). In an example, the performance metrics tracker 172 may compare the measured respective performance metric (e.g., 25 ms) with the determined comparison metric (e.g., 30 ms) to determine that the latency of the consumer 150 meets the predetermined threshold (e.g., 25 ms is less than 30 ms).

Figure 4:
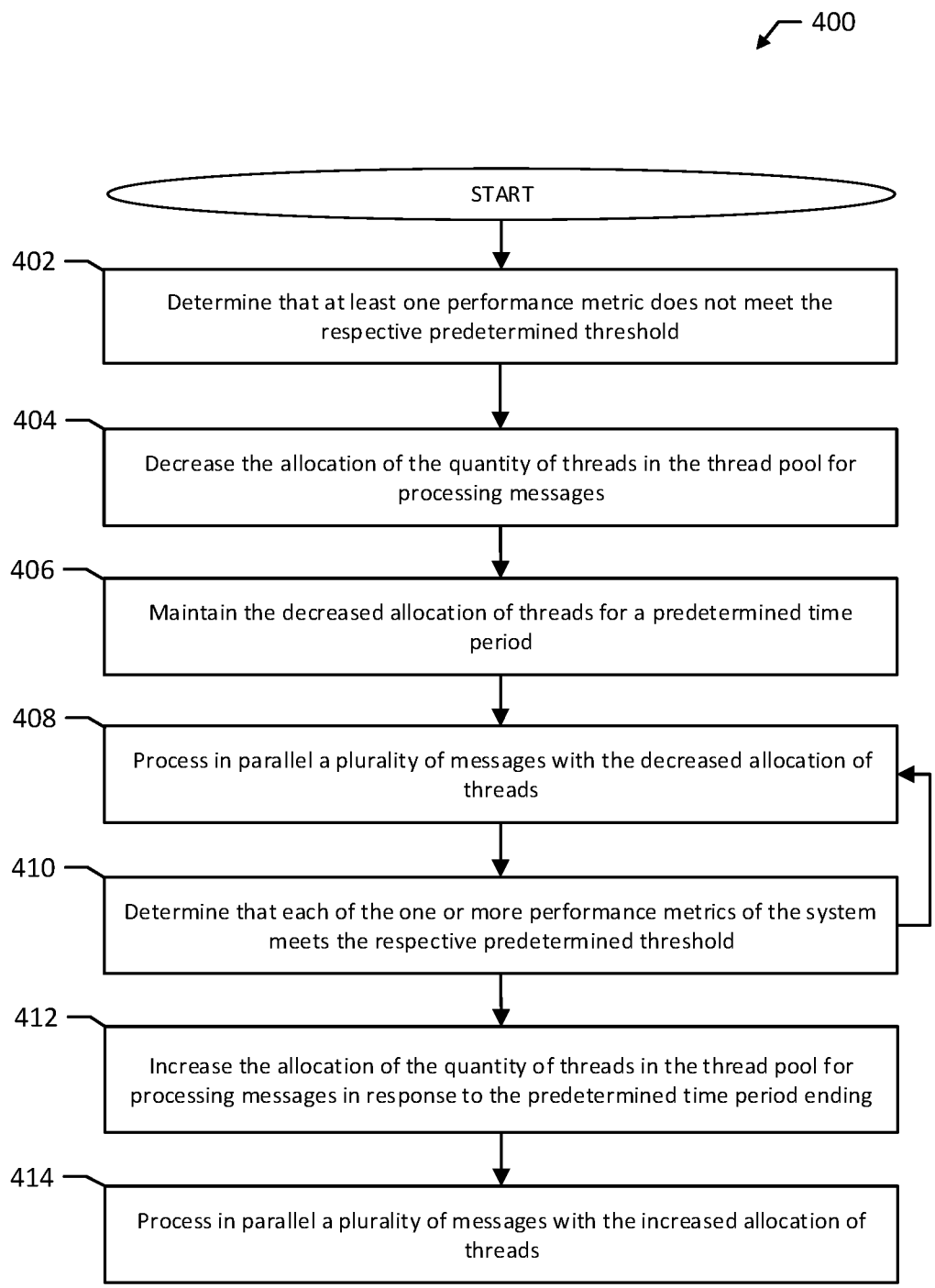
FIG. 4 shows a box diagram of an example method for updating an allocation of threads, according to an aspect of the present disclosure.

In various aspects of the present disclosure, the allocation of threads may be increased after certain criteria are met while maintaining the above-described decreased quantity. For example, the criteria may be that a predetermined time period (e.g., minutes) has elapsed or that a predetermined quantity of messages (e.g., 500) have been processed. FIG. 4 shows a flow chart of an example method 400 for increasing the allocation of the quantity of threads once a predetermined time period elapses after decreasing the allocation of the quantity of threads, according to an aspect of the present disclosure. Although the example method 400 is described with reference to the flowchart illustrated in FIG. 4, it will be appreciated that many other methods of performing the acts associated with the method 400 may be used. For example, the order of some of the blocks may be changed, certain blocks may be combined with other blocks, and some of the blocks described are optional. The method 400 may be performed by processing logic that may comprise hardware (circuitry, dedicated logic, etc.), software, or a combination of both.

The example method 400 includes determining that at least one performance metric does not meet the respective predetermined threshold (block 402). In an example, the performance metrics tracker 172 of the consumer 150 may measure a memory utilization of 95%, thus determining that the memory utilization of the consumer 150 does not meet its respective predetermined threshold (e.g., 90%). The example method 400 may then include decreasing the allocation of the quantity of threads in the thread pool for processing messages (block 404). In an example, the message processing controller 168 of the example consumer 150 may decrease the allocation of the quantity of threads (e.g. from 125 to 100) in the thread pool 170 for processing messages.

The example method 400 may then include maintaining the decreased allocation of threads for a predetermined time period (block 406). In an example, the message processing controller 168 may begin a timer to track a predetermined time period (e.g., 2 minutes) once the message processing controller 168 decreases the allocation of the quantity of threads. In another example, the message processing controller 168 may, additionally or alternatively, begin a count of a quantity of messages (e.g., 200) processed once decreasing the allocation.

The example method 400 may then include processing in parallel a plurality of messages with the decreased allocation of threads (block 408). In an example, the thread pool 170 of the example consumer 150 may process in parallel a plurality of messages with the decreased allocation of threads (e.g., 100). The example method 400 may then include determining that each of the one or more performance metrics of the system meets the respective predetermined threshold (block 410). In an example, the performance metrics tracker 172 may measure a memory utilization of 70% and a CPU utilization of 40% of the consumer 150, thus determining that each meets its respective predetermined threshold (e.g., 90% and 50%, respectively). The example method 400 may include repeatedly processing messages in parallel and determining that each performance metric meets its respective predetermined threshold until the predetermined time period (e.g., 2 minutes) elapses, as indicated by the arrow in FIG. 4 creating a loop. In other examples, blocks 408 and 410 may be repeated until a quantity of messages (e.g., 200) have been processed.

If during the predetermined time period or predetermined quantity of processed messages at least one performance metric fails to meet its predetermined threshold, then the example method 400 may include decreasing the quantity of threads allocated. For example, if the performance metrics tracker 172 measures memory utilization and CPU utilization of the consumer 150 four times after 30 seconds, prior to the 2 minute period elapsing, and on the fourth time measures a memory utilization of 92% and a CPU utilization of 45%, in some instances, the message processing controller 168 decreases the allocation of threads and resets the time period. In other words, after decreasing an allocation of threads (e.g., from 125 to 100) because the higher allocation (e.g., 125) caused a performance metric (e.g., memory utilization) to degrade to a threshold, the time period (or messages processed) is a test run for the decreased allocation of threads (e.g., 100). If the performance metrics (e.g., memory utilization and CPU utilization) of the consumer 150 meet their thresholds during the time period, then the consumer 150 may attempt to increase the allocation of threads again to the same quantity prior to the decrease (e.g., 125) or to a different quantity (e.g., 105). If, however, memory utilization and/or CPU utilization do not meet their respective threshold at some point during the 2 minute time period, then the decreased allocation of threads (e.g., 100) fails the test run and the message processing controller 168 further decreases the allocation of threads (e.g., to 90).

The example method 400 may then include increasing the allocation of the quantity of threads in the thread pool for processing messages in response to the predetermined time period ending (block 412). In an example, the message processing controller 168 of the example consumer 150 increases the allocation of the quantity of threads (e.g., from 100 to 105) in the thread pool 170 once the 2 minute time period elapses. The example method 400 may then include processing in parallel a plurality of messages with the increased allocation of threads (block 414). In an example, the thread pool 170 of the example consumer 150 may process in parallel a batch of messages from the message cache 166 with the increased allocation of threads (e.g., 105).

In some aspects of the present disclosure, example method 400 may include increasing the allocation of the quantity of threads (e.g., from 100) to the directly preceding quantity (e.g., 125) that had resulted in at least one performance metric failing to meet its predetermined threshold. In other aspects, the example method 400 may include increasing the allocation (e.g., 100) to a quantity (e.g., 110) that is less than the directly preceding quantity which resulted in at least one performance metric failing to meet its predetermined threshold (e.g., 125). In these other aspects, because the directly preceding quantity (e.g., 125) had previously caused at least one performance metric to degrade to its predetermined threshold, a lesser quantity (e.g., 110) is attempted and the performance metrics are again measured to determine if the lesser quantity (e.g., 110) still causes a degradation to the threshold. If the lesser quantity still results in such a degradation, then the example method 400 may include decreasing the allocation of the quantity of threads (e.g., from 110) back to the decreased quantity (e.g., 100), to a quantity in between (e.g., 105), or to a quantity less than the decreased quantity (e.g., 95).

Accordingly, the example method 400 enables the consumer 150 to attempt to increase its allocation of threads in the thread pool 170 for processing messages even though its last attempt resulted in at least one performance metric failing to meet its respective predetermined threshold. In some instances, circumstances affecting the ability of the consumer 150 to process messages may have changed (e.g., a downstream system no longer using the memory of the consumer 150) and thus the consumer 150 may be able to increase its allocation of threads without degrading its performance metrics, whereas it was unable to under the prior circumstances.

Figure 5:
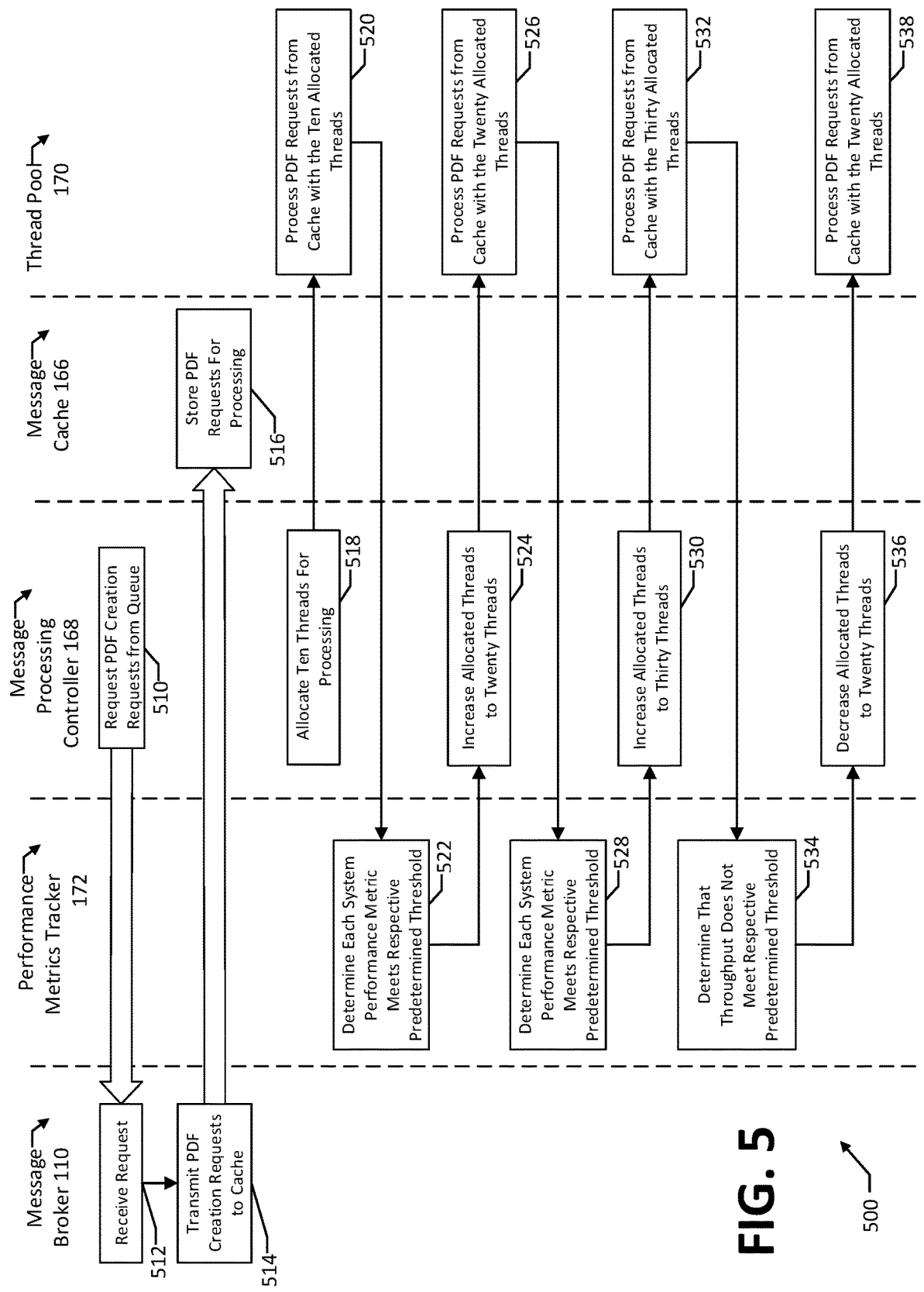
FIG. 5 shows a flow diagram of an example method for adapting an allocation of threads for processing messages, according to an aspect of the present disclosure.

FIG. 5 shows a flow diagram of an example method 500 for adapting an allocation of threads for creating PDF documents, according to an aspect of the present disclosure. For instance, in the example, a website application for creating PDF documents acts as a producer and transmits PDF creation requests to a message broker upon a user entering the required information into the website application. The consumer, a PDF processing application, may receive the PDF creation requests from the message broker and processes them accordingly to generate the PDF documents corresponding to the creation requests. The PDF processing application may be located on a server separate from the website application and the message broker. Although the example method 500 is described with reference to the flowchart illustrated in FIG. 5, it will be appreciated that many other methods of performing the acts associated with the method 500 may be used. For example, the order of some of the blocks may be changed, certain blocks may be combined with other blocks, and some of the blocks described are optional. The method 500 may be performed by processing logic that may comprise hardware (circuitry, dedicated logic, etc.), software, or a combination of both.

The example method 500 includes the message processing controller 168 of the PDF processing application requesting PDF creation requests from a message broker 110 (block 510). For example, the message processing controller 168 may request a certain quantity of PDF creation requests, or amount of data, from the message broker 110. Then, the message broker 110 receives the request for PDF creation requests (block 512). The message broker 110 then transmits PDF creation requests to the PDF processing application (block 514). The PDF processing application's message cache 166 then receives and stores the PDF creation requests for processing (block 516).

The example method 500 may then include the message processing controller 168 of the PDF processing application allocating ten threads in the thread pool 170 for processing PDF creation requests (block 518). The PDF processing application's thread pool 170 may then process PDF creation requests from the message cache 166 with the ten allocated threads (block 520). For instance, processing the PDF creation request may include generating a PDF document from the information in the received PDF creation request. The PDF processing application's performance metrics tracker 172 then determines that each system performance metric of the PDF processing application meets a respective predetermined threshold (block 522). For example, the performance metrics tracker 172 may determine that the throughput, latency, and system utilization of the PDF processing application all meet their respective predetermined thresholds as the application processes PDF creation requests.

The example method 500 may then include the message processing controller 168 of the PDF processing application increasing the allocated threads in the thread pool 170 to twenty threads (block 524). In other examples, the allocated threads may be increased to a smaller or larger quantity than twenty. The thread pool 170 of the PDF processing application then processes PDF creation requests from the message cache 166 with the twenty allocated threads (block 526). The PDF processing application's performance metrics tracker 172 then determines that each system performance metric of the PDF processing application meets a respective predetermined threshold (block 528). The message processing controller 168 may then accordingly increase the allocated threads to thirty threads (block 530). In other examples, the allocated threads may be increased to a smaller or larger quantity than thirty.

The example method 500 may then include the thread pool 170 of the PDF processing application processing PDF creation requests from the message cache 166 with the thirty allocated threads (block 532). The PDF processing application's performance metrics tracker 172 may then determine that the application's throughput does not meet its respective predetermined threshold (block 534). For instance, the performance metrics tracker 172 may determine that the rate at which the PDF processing application is creating PDF documents is lower than a set rate. The decreased throughput may, for example, be because thirty threads is more processing than the PDF processing application's processor can handle, thus slowing down overall system performance. In some examples, the performance metrics tracker 172 may, additionally or alternatively, determine that the latency and/or system utilization of the PDF processing application also do not meet their predetermined thresholds.

The example method 500 may then include the message processing controller 168 of the PDF processing application decreasing the allocated threads in the thread pool 170 to twenty threads (block 536). In other examples, the allocated threads may be decreased to a smaller or larger quantity than twenty. The thread pool 170 of the PDF processing application then processes PDF creation requests from the message cache 166 with the twenty allocated threads (block 538).

Figure 6:
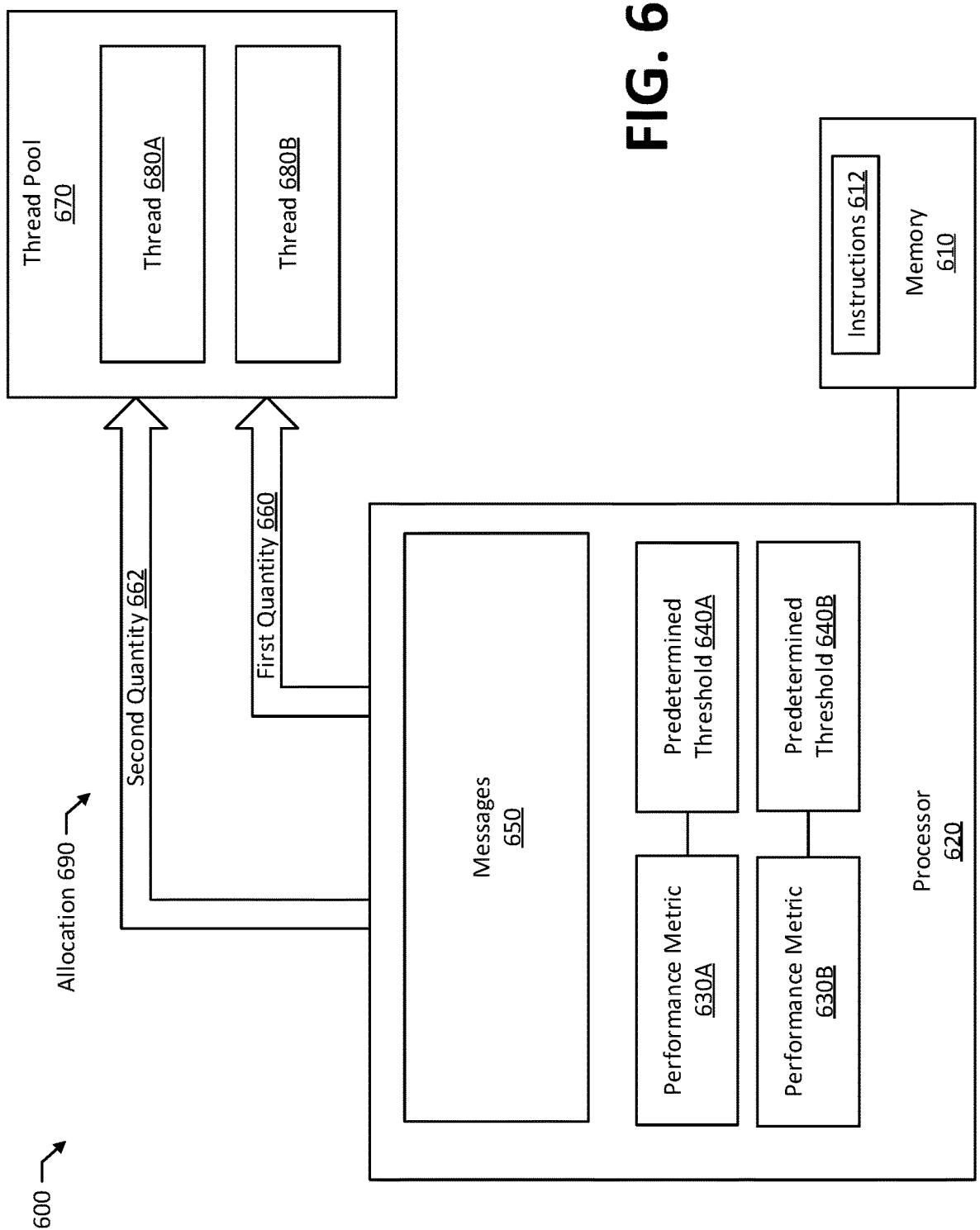
FIG. 6 shows an example system for processing messages with a thread pool, according to an aspect of the present disclosure.

FIG. 6 shows a block diagram of an example system for adaptively adjusting a quantity for threads for processing messages, according to an aspect of the present disclosure. System 600 includes a processor 620 in communication with a memory 610 storing instructions 612. The instructions 612, when executed by the processor 620, cause the processor 620 to allocate a first quantity 660 of threads 680A, 680B in a thread pool 670 to process a plurality of messages 650. The processor 620 also measures one or more performance metrics 630A, 630B of the system 600 while processing in parallel the first plurality of messages 650 with the first quantity 660 of threads 680A, 680B.

The instructions 612 also cause the processor 620 to determine whether each of the one or more performance metrics 630A, 630B meets a respective predetermined threshold 640A, 640B. For instance, the processor may determine whether the performance metric 630A meets the predetermined threshold 640A and whether the performance metric 630B meets the predetermined threshold 640B. The processor 620 also increases the allocation 690 of the first quantity 660 of threads 680A, 680B to a second quantity 662 of threads (e.g., 680A, 680B, etc.) in the thread pool 670 in response to determining that each of the one or more performance metrics 630A, 630B meets the respective predetermined threshold 640A, 640B.

It will be appreciated that all of the disclosed methods and procedures described herein can be implemented using one or more computer programs or components. These components may be provided as a series of computer instructions on any conventional computer readable medium or machine-readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as GPUs, ASICs, or any other similar devices. The instructions may be configured to be executed by one or more processors, which when executing the series of computer instructions, performs or facilitates the performance of all or part of the disclosed methods and procedures.

Without further elaboration, it is believed that one skilled in the art can use the preceding description to utilize the claimed inventions to their fullest extent. The examples and embodiments disclosed herein are to be construed as merely illustrative and not a limitation of the scope of the present disclosure in any way. It will be apparent to those having skill in the art that changes may be made to the details of the above-described embodiments without departing from the underlying principles discussed. In other words, various modifications and improvements of the embodiments specifically disclosed in the description above are within the scope of the appended claims. For example, any suitable combination of features of the various embodiments described is contemplated.

The invention is claimed as follows:

1. A system comprising:
a processor; and
a memory storing instructions, which when executed by the processor, cause the processor to:
allocate a first quantity of threads in a thread pool to process a first plurality of messages in parallel;
measure one or more performance metrics of the entire system as a whole while processing in parallel the first plurality of messages with the first quantity of threads;
determine whether each of the one or more performance metrics of the entire system as a whole meets a respective predetermined system-wide threshold; and
increase the allocation of the first quantity of threads to a second quantity of threads in the thread pool in response to determining that each of the one or more performance metrics of the entire system as a whole meets the respective predetermined system-wide threshold.

2. The system of claim 1, wherein the instructions further cause the processor to:
measure the one or more performance metrics of the entire system as a whole while processing in parallel a second plurality of messages with the second quantity of threads;
determine whether each of the one or more performance metrics of the entire system as a whole meets the respective predetermined threshold;
decrease the allocation of the second quantity of threads to a third quantity of threads in response to determining that at least one performance metric of the entire system as a whole does not meet the respective predetermined threshold; and
process in parallel a third plurality of messages with the third quantity of threads.

3. The system of claim 2, wherein the third quantity of threads is equal to the first quantity of threads.

4. The system of claim 2, wherein the instructions further cause the processor to measure the one or more performance metrics of the entire system as a whole while processing in parallel the third plurality of messages with the third quantity of threads.

5. The system of claim 2, wherein the instructions further cause the processor to:
maintain an allocation of threads for a predetermined time period, wherein the predetermined time period begins after decreasing the allocation of the second quantity of threads to the third quantity of threads; and
increase the allocation of the third quantity of threads to a fourth quantity of threads in response to the predetermined time period ending.

6. The system of claim 5, wherein the fourth quantity of threads is equal to or less than the second quantity of threads.

7. The system of claim 2, wherein the instructions further cause the processor to:

maintain an allocation of threads for a predetermined quantity of messages processed after decreasing the allocation of the second quantity of threads to the third quantity of threads; and increase the allocation of the third quantity of threads to a fourth quantity of threads in response to the predetermined quantity of messages being processed.

8. The system of claim 7, wherein the fourth quantity of threads is equal to or less than the second quantity of threads.

9. The system of claim 2, wherein the instructions cause the processor to decrease the allocation of the second quantity of threads to the third quantity of threads in response to determining that at least one performance metric of the entire system as a whole does not meet the predetermined threshold for a predetermined amount of time or a predetermined quantity of messages processed.

10. The system of claim 1, wherein the one or more performance metrics of the entire system as a whole include at least one of throughput, latency, and system utilization.

11. The system of claim 10, wherein the predetermined threshold for throughput is a rate at which the system processes messages.

12. The system of claim 10, wherein the predetermined threshold for latency is an amount of time to process a message.

13. The system of claim 10, wherein the predetermined threshold for system utilization is a utilization of the processor or the memory.

14. A method comprising:
allocating a first quantity of threads in a thread pool to process a first plurality of messages in parallel;
measuring one or more performance metrics of the entire system as a whole while processing in parallel the first plurality of messages with the first quantity of threads;
determining whether each of the one or more performance metrics of the entire system as a whole meets a respective predetermined system-wide threshold; and
increasing the allocation of the first quantity of threads to a second quantity of threads in the thread pool in response to determining that each of the one or more performance metrics of the entire system as a whole meets the respective predetermined system-wide threshold.

15. The method of claim 14, further comprising continuously measuring the one or more performance metrics of the entire system as a whole.

16. The method of claim 14, further comprising measuring the one or more performance metrics of the entire system as a whole at each instance a predetermined quantity of messages are processed or at each instance a predetermined time period has elapsed.

17. The method of claim 14, wherein determining whether the respective performance metric of the entire system as a whole meets the predetermined threshold includes comparing the respective performance metric of the entire system as a whole at a time subsequent to processing the first plurality of messages to the respective performance metric of the entire system as a whole at a time preceding processing the first plurality of messages.

18. The method of claim 14, further comprising determining a comparison metric of the entire system as a whole for a respective performance metric of the entire system as a whole,
wherein determining the comparison metric of the entire system as a whole includes measuring the respective performance metric of the entire system as a whole for a predetermined time period or for a predetermined quantity of processed messages, and
wherein determining whether a respective performance metric of the entire system as a whole meets the predetermined threshold includes comparing the respective performance metric of the entire system as a whole to the determined comparison metric of the entire system as a whole.

19. A non-transitory, computer-readable medium storing instructions which, when performed by a processor, cause the processor to:
allocate a first quantity of threads in a thread pool to process a first plurality of messages in parallel;
measure one or more performance metrics of the entire system as a whole while processing in parallel the first plurality of messages with the first quantity of threads;
determine whether each of the one or more performance metrics of the entire system as a whole meets a predetermined system-wide threshold; and
increase the allocation of the first quantity of threads to a second quantity of threads in the thread pool in response to determining that each of the one or more performance metrics of the entire system as a whole meets the predetermined system-wide threshold.

20. The non-transitory, computer-readable medium of claim 19, wherein the instructions further cause the processor to request messages from an external message broker.

* * * * *